July 16, 1957

M. E. BOURNS ET AL 2,799,757

VARIABLE RESISTOR

Filed July 30, 1953

INVENTORS
MARLAN E. BOURNS
WILBUR T. HARDISON
BY
*Herbert E. Kidder*
AGENT

United States Patent Office 2,799,757
Patented July 16, 1957

2,799,757

VARIABLE RESISTOR

Marlan E. Bourns and Wilbur T. Hardison, Riverside, Calif.; said Hardison assignor to said Bourns Application July 30, 1953, Serial No. 371,261

9 Claims. (Cl. 201—62)

The present invention relates to variable resistors or potentiometers, and more particularly to those having a contact-carrying shaft, which is moved rectilinearly.

In many applications, particularly in the fields of aircraft and guided missiles, it is desirable to use a transducer wherein a variable voltage or variable resistance output corresponds to the position of the shaft. In one well known embodiment, the shaft slides within and is supported by a long bearing at one end of the instrument case. It is necessary that the bearing be relatively long and that the shaft be relatively large in diameter to provide the required accuracy and rigidity, and to keep the contact in proper alignment and parallelism with the electrical elements. This long bearing also requires that the total length of the instrument be rather long. Even with a long bearing and large shaft, some problem arises when the shaft is in the fully retracted position. Since the internal portion of the shaft is supported only at one end and since the contact is customarily supported by means of this shaft, vibration of the instrument may cause the shaft and contact assembly to move or vibrate, which may tend to introduce inaccuracies or electrical "noise."

The primary object of our invention is to provide a linear motion resistor or potentiometer embodying a contact carrier mounted on the end of a reciprocating shaft, and having a novel arrangement for supporting the shaft at both ends, thereby providing extreme rigidity, while at the same time permitting the use of relatively short bearings and small diameter shafts.

Another object of our invention is to provide an instrument wherein the operating components are completely contained within one assembly, so that adjustments of contact pressure and electrical settings may be made quickly and easily, after which the protective cover is added when all adjustments have been completed.

A further object of our invention is to provide a novel arrangement for preventing the contact assembly from rotating relative to the remainder of the instrument. This is accomplished by utilizing a contact assembly shaped to conform to the inside of the housing and slidably engaging the same. The contact assembly is mounted on a reciprocable shaft that is offset from the center of the housing in an eccentric relationship, and any tendency of the contact assembly to rotate about the axis of the shaft is prevented by the interference of the housing.

Still another object of our invention is to provide a novel arrangement for carrying the electrical connections from one end of the instrument to the other, so as to permit simplication in construction, easier assembly, and a more compact instrument.

The foregoing and other objects and advantages of the invention will become apparent to those skilled in the art upon consideration of the following detailed description of the preferred embodiment thereof, reference being had to the accompanying drawings, wherein.

Figure 1:
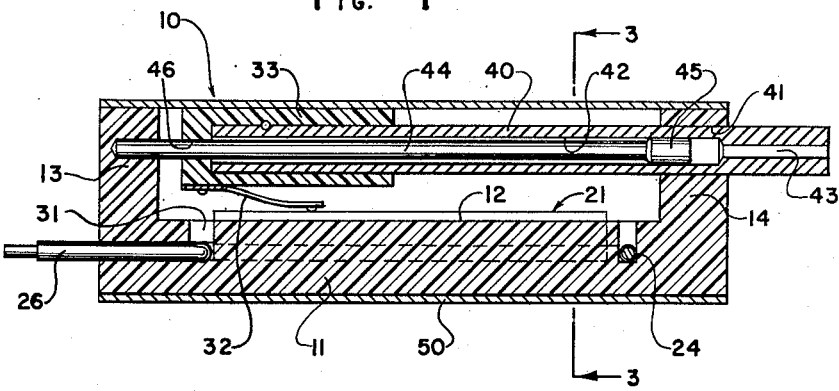
Figure 1 is a longitudinal vertical section through a potentiometer embodying the principles of the invention.
Figure 2:
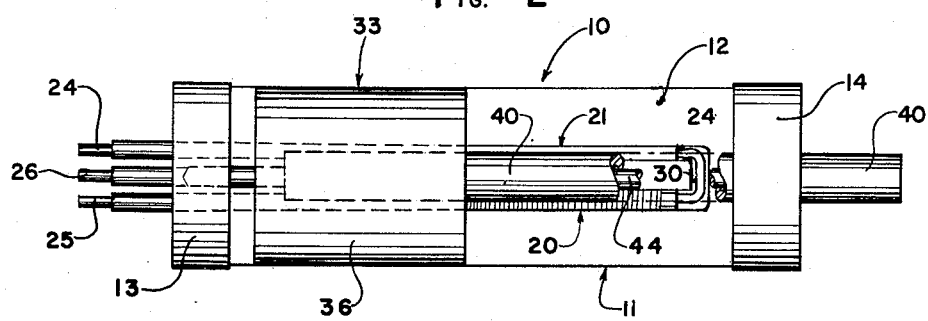
Figure 2 is a top plan view of the same, with the cover removed.
Figure 3:
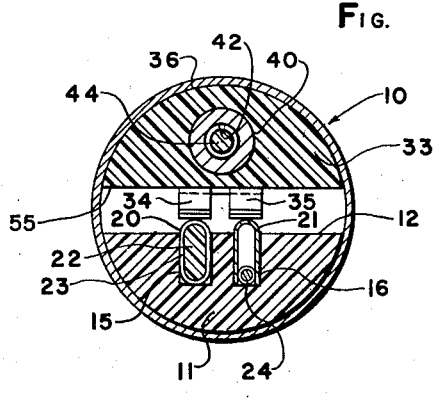
Figure 3 is a transverse section through the instrument, taken at 3—3 in Figure 1.

In the drawings, the instrument is designated in its entirety by the reference numeral 10, and is seen to comprise a molded plastic body 11 of generally cylindrical form, having a depressed flat portion 12 lying between end portions 13 and 14 of circular cross section. Formed side by side in the flat portion 12 are two channels or grooves 15 and 16, which extend longitudinally of the body and are parallel to one another. A wire-wound resistance element 20 is seated within the channel 15, and an inverted U-shaped conductor element 21 is seated within the channel 16.

The wire-wound resistance element 20 comprises a plastic card or core 22, around which fine resistance wire 23 is wound. Terminal wires 24 and 25 are connected to opposite ends of the resistance wire 23, and a third terminal wire 26 is connected to the conductor element 21. In order to bring all three terminal wires out one end of the body, the terminal wire 24 which is connected to the right-hand end of the resistance element 20, is brought over to channel 16 through a short transverse connecting channel 30, and passes down the full length of channel 16 under the conductor element 21. The conductor wire 24 is electrically insulated from the conductor element 21 and therefore there is no conduction between them. It will also be noted that the other terminal wires 25 and 26 are likewise insulated. The center terminal wire 26 extends over to the conductor 21 through a short cross channel 31 (Figure 1), and is soldered thereto.

Slidably engaging the elements 20, 21 is a U-shaped contact 32, which is mounted on a carrier 33. The contact 32 has two arms 34 and 35 that ride on the resistance element and conductor element, respectively. Through this arrangement, the voltage picked up by contact arm 34 is transmitted to the conductor element 21 and brought out of the instrument through terminal wire 26.

The carrier 33 is preferably molded of phenolic resin plastic and is provided with a flat bottomed surface 55 to which the contact 32 is attached, and a cylindrical outer surface 36 of the same radius and center as the body 11. The carrier 33 is fixedly mounted on a tubular shaft 40 which extends through and is slidable within a bearing hole 41 in the end portion 14 of the body. The shaft 40 has a smooth bore 42 formed centrally therein for the greater part of its length, and connecting the right-hand end of the bore with the atmosphere at the outer end of the shaft is a breather hole 43, the purpose of which will become apparent presently.

Embedded in the left-hand end portion 13 of the body is a rod 44 of slightly smaller diameter than the bore 42, the said rod being aligned with the bore and extending into the same for a substantial distance, as shown in Figure 1. At the right-hand end of the rod is a slightly enlarged bearing portion 45, which is a sliding fit within the bore 42, and which engages the same substantially within the area of the right-hand end portion 14. The rod 44 extends through a hole 46 in the end of the carrier 33, the said hole being of substantially the same diameter as the rod so that it is a sliding fit thereon and provides bearing support for the carrier on the rod.

Surrounding the body 11 and parts associated therewith is a tubular sleeve cover 50, which encloses and protects the electrical elements. The cover 50 forms the housing for the unit, and is attached to the body 11 in any suitable manner.

The operation of our invention is believed to be fairly self evident from the foregoing description and the drawings. A voltage is applied to the two ends of the resistance element 20 through terminal wires 24 and 25, and the voltage picked up by contact arm 34 is transmitted through contact arm 35 to the conductor element 21 and thence to terminal wire 26. The voltage difference between either of the wires 24, 25 and wire 26 is a function of the position of the shaft 40.

The tubular shaft 40 and rod 44 telescopically associated therewith form the rigid supporting arrangement for guiding and supporting the contact. The rod 44 is supported at its right-hand end by virtue of the sliding engagement of the bearing portion 45 with the inside of the bore 42, and the rod is therefore supported at both of its ends. Shaft 40 is slidably supported within the bearing 41 and is also supported on the rod 44 immediately adjacent the contact 32 by the bearing portion 46. This arrangement provides a maximum of rigidity for the unit within a minimum of length. The breather hole 43 permits air to be drawn into and expelled from the bore 42 by the piston-like action of the bearing member 45.

The carrier 33 slidably engages the inside surface of the cover 50 and is constrained thereby against rotation about the axis of the shaft 40, owing to the eccentric relationship between the shaft 40 and the center of cylindrical curvature of the surface 36.

While we have shown and described in detail what we believe to be the preferred form of our invention, it will be understood that various changes may be made in the shape and arrangement without departing from the broad scope of the claims appended hereto.

We claim:

1. A linear motion variable resistor comprising a body having an electrical element mounted thereon, a shaft disposed parallel to said electrical element, a contact assembly mounted on one end of said shaft and slidably engaging said electrical element, a bearing on said body at one end of said electrical element supporting said shaft for reciprocating movement, and additional bearing means attached to said body adjacent the other end of said electrical element and slidably engaging said shaft adjacent said first-named bearing, said one end of said shaft with said contact assembly mounted thereon being slidably supported on said additional bearing means.

2. A linear motion variable resistor comprising a body having an electrical element mounted thereon, a hollow shaft disposed parallel to said electrical element, a contact assembly mounted on one end of said shaft and slidably engaging said electrical element, a bearing on said body at one end of said electrical element supporting said shaft for reciprocating movement, and a rod attached at one end to said body and projecting into the hollow center of said shaft, said rod slidably engaging the inside surface of said shaft adjacent said bearing, said one end of said shaft with said contact assembly mounted thereon being slidably supported on said rod.

3. A linear motion variable resistor comprising a body having an electrical element mounted thereon, a shaft disposed parallel to said electrical element and movable lengthwise with respect thereto, said shaft having a longitudinal bore provided therein, a carrier mounted on one end of said shaft and having a contact slidably engaging said electrical element, a bearing on said body supporting said shaft for reciprocating movement, and a rod attached to said body and extending into said bore, said rod slidably engaging the inner surface of said bore adjacent said bearing, and said carrier slidably engaging the outer surface of said rod.

4. A linear motion variable resistor comprising a body having an electrical element mounted thereon, a shaft disposed parallel to said electrical element and movable lengthwise with respect thereto, said shaft having a longitudinal bore provided therein, a carrier mounted on one end of said shaft and having a contact slidably engaging said electrical element, a bearing on said body supporting said shaft for reciprocating movement, and a rod attached to said body and extending into said bore, said rod being smaller in diameter than said bore and having an enlarged bearing portion at the inner end thereof slidably engaging the bore surface, said carrier having a bearing portion engaging the outer surface of said rod.

5. A linear motion variable resistor comprising a generally cylindrical body having a depressed flat portion provided thereon intermediate its ends, an electrical element mounted on said flat portion parallel to the axis of said body, a shaft extending through one end of said body parallel to said electrical element, said shaft being slidably supported in said one end of said body and having a longitudinal bore provided therein, a carrier mounted on the inner end of said shaft and having a contact slidably engaging said electrical element, a rod attached to the other end of said body and extending into said bore, a bearing portion on the inner end of said rod slidably engaging the bore surface, a bearing portion on said carrier slidably engaging said rod, and a tubular sleeve enclosing said body and associated parts.

6. A linear motion variable resistor comprising a generally cylindrical body having a depressed flat portion provided thereon intermediate its ends, an electrical element mounted on said flat portion parallel to the axis of said body, a shaft extending through one end of said body parallel to said electrical element and offset from the center of said body, said shaft being slidably supported in said one end of said body, a carrier mounted on the inner end of said shaft and having a contact slidably engaging said electrical element, said carrier being shaped to form a continuation of the cylindrical surface of said body, and a tubular sleeve enclosing said body and associated parts, said carrier conforming to and slidably engaging the inside surface of said tubular sleeve, and being prevented thereby from turning about the axis of said shaft.

7. A linear motion variable resistor comprising a body having an electrical element mounted thereon, a shaft extending through one end of said body parallel to said electrical element, said shaft being slidably supported in said one end of said body and having a longitudinal bore provided therein, a contact mounted on the inner end of said shaft and wiping on said electrical element, a rod attached to the other end of said body and extending into said bore, a bearing portion on the inner end of said rod slidably engaging the bore surface, and a bearing portion adjacent said contact slidably engaging said rod.

8. A linear motion variable resistor comprising a body having end portions and an intermediate portion, said end portions being cylindrically curved on at least a portion of their surface area, an electrical element mounted on said intermediate portion parallel to the longitudinal axis of said body, a shaft extending through one of said end portions parallel to said electrical element and offset from the center of curvature of said cylindrically curved portions, said shaft being slidably supported in said one end portion of said body, a carrier mounted on the inner end of said shaft and having a contact slidably engaging said electrical element, said carrier being shaped to form a continuation of said cylindrically curved areas on said end portions, and a cover having a cylindrically curved portion matching the cylindrically curved areas of said end portions, said carrier conforming to and slidably engaging the inside surface of said cover, and being prevented thereby from turning about the axis of said shaft.

9. A linear motion variable resistor comprising a body having an elongated center section with upstanding end portions at opposite ends thereof, a resistance element mounted on said center section between said end portions, a contact member slidable along the length of said resistance element, an actuating member fixed to said contact member and extending through one of said upstanding end portions, a tubular case enclosing said body and engaging said end portions with a snug-fitting contact, whereby the center section of said body is sealed against dust and moisture, and terminal conductors connected to the ends of said resistance element and to said contact member, said conductors passing out of said body through the other of said end portions.

References Cited in the file of this patent

UNITED STATES PATENTS

| | | |
|---|---|---|
| 2,242,327 | Rubinstein | May 20, 1941 |
| 2,266,412 | Cochrane | Dec. 16, 1941 |
| 2,420,807 | Aufiero | May 20, 1947 |
| 2,706,230 | Bourns et al. | Apr. 12, 1955 |